US006873917B2

(12) United States Patent
Ulrich et al.

(10) Patent No.: US 6,873,917 B2
(45) Date of Patent: Mar. 29, 2005

(54) METHOD AND CONTROL UNIT FOR DETERMINING THE PROBABILITY OF FAILURE OF A MOTOR-VEHICLE COMPONENT

(75) Inventors: Dieter Ulrich, Stuttgart (DE); Dieter Eppinger, Dettingen (DE); Wolfgang Haydn, Leonberg (DE); Andreas Scheffold, Reichenbach (DE); Manfred Bacher-Hoechst, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/412,055

(22) Filed: Apr. 11, 2003

(65) Prior Publication Data

US 2004/0034504 A1 Feb. 19, 2004

(30) Foreign Application Priority Data

Apr. 11, 2002 (DE) ........................................ 102 15 865

(51) Int. Cl.[7] ................................................ G06F 15/00

(52) U.S. Cl. .......................... 702/35; 60/602; 477/123; 702/184

(58) Field of Search ............................ 702/35, 81, 83, 702/181, 182, 183, 184, 34; 700/90, 93; 477/123, 150; 123/90.15, 41 E, 493; 73/577, 760; 60/602

(56) References Cited

U.S. PATENT DOCUMENTS

| | | | | |
|---|---|---|---|---|
| 3,744,300 A | | 7/1973 | Fleury | 73/577 |
| 4,336,595 A | | 6/1982 | Adams et al. | 702/34 |
| 4,620,420 A | * | 11/1986 | Gloss et al. | 60/602 |
| 5,531,122 A | | 7/1996 | Chatham et al. | 73/760 |
| 6,691,065 B2 | * | 2/2004 | Hayashi et al. | 702/184 |
| 6,695,747 B2 | * | 2/2004 | Zimmermann et al. | 477/123 |

FOREIGN PATENT DOCUMENTS

| | | |
|---|---|---|
| DE | 41 12 588 | 10/1992 |
| DE | 42 26 010 | 2/1994 |
| DE | 195 16 481 | 10/1999 |
| DE | 100 60 694 | 6/2002 |
| EP | 0 231 155 | 8/1987 |

OTHER PUBLICATIONS

Clormann, U.H., Seeger, T., Rainflow—HCM—"A Counting Method for Establishing Fatigue Limit on the Basis of Material Mechanics, Stahlbau ", *Steel Construction* (1986), pp. 65–71.

Haibach, E., "Fatigue Limit, Methods and Data for Designing Components Parts", *VDI Publishing House GmbH* (1989), pp. 12–41, pp. 63–96, pp. 174–189, and pp. 191–225.

Miner, M.A., "Cumulative Damage in Fatigue", *J. Applied Mechanics 12*, 1945, pp. 159–164.

* cited by examiner

*Primary Examiner*—John Barlow
*Assistant Examiner*—John Le
(74) *Attorney, Agent, or Firm*—Kenyon & Kenyon

(57) ABSTRACT

A method and control unit for determining the failure probability of a component of a motor-vehicle. Data in the form of damage-relevant influence parameters, which affect the failure probability of the component, are measured and stored during the operation of the component. To ascertain the failure probability, a collective loading is calculated as a determining influence parameter for establishing the fatigue limit of the component. To determine the collective loading as realistically as possible and therefore determine the failure probability as accurately as possible, the influence parameters may be evaluated during the operation of the component, in a control unit of the motor-vehicle for determining the failure probability.

17 Claims, 2 Drawing Sheets

METHOD AND CONTROL UNIT FOR DETERMINING THE PROBABILITY OF FAILURE OF A MOTOR-VEHICLE COMPONENT

FIELD OF THE INVENTION

The present invention relates to a method for determining the probability of failure of a motor-vehicle component. The present invention also relates to a memory element for a control unit for controlling and/or regulating a motor-vehicle function that may be implemented by at least one component. The present invention also relates to a control unit for controlling and/or regulating a motor-vehicle function that may be implemented by at least one component.

BACKGROUND INFORMATION

Regarding material fatigue, modern motor-vehicle components, such as fuel-injection systems (direct gasoline injection, BDE; common rail) and hydraulic units for anti-lock braking systems (ABS), are increasingly no longer designed to be resistant to fatigue, but are rather designed to have a fatigue limit. The aim of the fatigue-limit design is that the relevant components reliably satisfy their specified service lives but are not resistant to fatigue, that is, they have a finite service life. This allows the components to be designed to be smaller, lighter, less expensive, and therefore more functional as well (that is, each can be brought into line with its exact function and operating conditions). A component failure must be reliably prevented, since this can generally lead to serious material damage and injury to persons (vehicle fire, brake failure, etc.).

A method and control unit of the type mentioned at the outset are referred to in German Patent Publication No. 195 16 481, which refers to a method and a control unit for monitoring, storing, and outputting influence parameters of the control unit. The monitored and stored data can be output as needed, for example, for assessing the probability of failure and reliability of the control unit. However, the fact that the influence parameters monitored and stored must first be fetched out of the control unit and input into an external analyzer device for determining the failure probability only allows a very irregular and rare determination of the failure probability.

According to the related art, one proceeds as follows for determining the failure probability of a component: First of all, a so-called fatigue-limit test is carried out for the components to be tested, that is, for the individual component parts of the components. In the course of the fatigue-limit test, the tolerable loading for the component or the component parts is determined until they fail. A so-called Woehler curve (stress-number curve) is then ascertained for some component parts of the components. The Woehler curve is an observation function (characteristic function) of the loading capacity of a component part. A so-called loading collective (or collective loading) is then determined, which is customary for the operation of the component or the component parts and, in the case of motor-vehicle components, includes, for example, x % city driving, y % inter-urban (overland) driving, and z % expressway driving, where x %+y %+z %=100%.

A collective damage sum (D_Koll), which is a measure of the accumulated damage of the component to be tested after a collective run-through (cycle), is determined according to the so-called linear damage-accumulation hypothesis of Palmgren-Miner, using the collective loading and the Woehler curve. Using the Woehler curve of the structural element and the fatigue-limit test, a tolerable-damage sum (D_50%), which is a measure of the damage sum that the component can endure up to failure, is likewise determined according to Palmgren-Miner. The failure probability of the component may be calculated by comparing collective-damage sum (D_Koll) and tolerable damage sum (D_50%) within the scope of a failure-probability calculation.

In other words, tests on real component parts of a component determine, first of all, which loading and which damage sum the component parts and the component may endure, respectively, up to the point of failure. Secondly, a selected, collective loading is run through during the operation of the component, and influence parameters are measured in the process. The sum of the damage, which acts on the component during the collective run-through of the selected, collective loading, is calculated by evaluating the influence parameters.

The component parts of the components may now be designed in such a manner, that collective-damage sum (D_Koll) lies below damage sum (D_50%) by a sufficiently large safety factor and the structural elements therefore do not fail during an average, estimated operational life. This type of component design may be referred to as fatigue-limit design.

One may not plot an arbitrary number of influence parameters due to the relatively limited storage space in a motor-vehicle control unit. This means that the collective loading must be selected carefully, in order to still supply a reliable indicator of the real operating conditions of the components in spite of the low number of influence parameters plotted.

According to the related art, the fatigue limit is established in the product-formation process. In this case, a customary procedure is the above-described method, the so-called nominal-stress concept (cf. Haibach, E.: Betriebsfestigkeit, Verfahren und Daten zur Bauteilberechnung [Fatigue Limit, Method and Data for Designing Component Parts], Duesseldorf: VDI Publishing House GmbH (1989), ISBN 3-18-400828-2, Chapter 3.2 Calculation of Service Life from the Nominal Stress). The nominal-stress concept requires the Woehler component-part test (single-stage test) (cf. Haibach, E.: Fatigue Limit . . . , at the specified location, Chapter 2.1 Woehler Tests), the fatigue-limit test (multistage test) (cf. Haibach, E.: Fatigue Limit . . . , at the specified location, Chapter 2.2.1 Working Load and Collective Loading), and the collective-loading measurement, in which the parameters relevant to damage are determined during practical use. Collective-damage sum (D_Koll) at or with respect to a selected design point (that is, service-life target, for example, length of travel, switching cycles, operating time, etc.) is calculated from the Woehler component-part test and the collective loading, using the Miner rule (cf. Miner, M. A.: Cumulative Damage in Fatigue, J. Appl. Mech. 12 (1945), pp. 159–164 and Haibach, E.: Fatigue Limit . . . , at the specified location, Chapter 3.2 Calculation of Service Life from the Nominal Stress). In addition, tolerable-damage sum (D_50%) resulting in the failure of the component is determined by a fatigue-limit test. In the scope of the fatigue-limit test, the component part is loaded to the point of failure, using a typical collective loading. The comparison of D_50% and D_Koll determines whether or not the design of the component parts or the component is reliable.

The collective loading, which represents a determining influence variable of the available method for establishing the fatigue limit, is user-specific and is essentially a function of the following influence parameters:

individual usage habits;

type and parameters of the open-loop control/closed-loop control of a function that may be implemented by the component;

measuring accuracy of sensors for controlling/regulating the function; and design or structural characteristics.

Using a fuel-injection system for an internal combustion engine as an example, these influence parameters include, in particular:

characteristic maps typical of the application;

design of a pressure regulator for regulating an injection pressure prevailing in the fuel-injection system;

dynamic pressure increases dependent on construction;

exceptional events (breakdown);

measuring accuracy of a pressure sensor situated in the fuel-injection system;

individual driving technique (sporty or comfort-oriented driver);

operating conditions of the vehicle (for example, delivery traffic);

number of starts of the internal combustion engine; and total distance driven, among other things.

To design the structural elements of the components, the available method must assume worst-case conditions for each influence parameter, since the exact, subsequent operating conditions vary individually. To design the structural elements, one must assume the most severe collective loading possible for the application in question. This is, of course, full of uncertainty. In order to reliably cover this, some conservative assumptions must be made regarding the layout of the collective loading, which makes it necessary for the component parts to have higher strengths. In essence, higher strengths may only be achieved by higher-quality, that is, more expensive materials, more expensive manufacturing methods, or designs that are more complicated structurally. Therefore, higher strengths result in the components being more expensive and having a higher weight.

SUMMARY OF THE INVENTION

The exemplary method of the present invention relates to a method for determining the probability of failure of a motor-vehicle component. Data in the form of damage-relevant influence parameters, which affect the failure probability of the component, are recorded and stored during the operation of the component.

The exemplary embodiment of the present invention also relates to a memory element for a control unit for controlling and/or regulating a motor-vehicle function that may be implemented by at least one component. A computer program, which is executable on a computing element, in particular on a microprocessor, of the control unit, is stored in the memory element. A read-only memory, a random-access memory, or a flash memory, may be used as a memory element.

The exemplary embodiment of the present invention also relates to a control unit for controlling and/or regulating a motor-vehicle function that may be implemented by at least one component. The control unit includes an arrangement to monitor and store data during the operation of the component, in the form of influence parameters which are relevant to danger and affect the probability of failure of the component.

The exemplary embodiment and/or method of the present invention may be used to establish the collective loading as a determining influence variable for verifying the fatigue limit of a component as realistically as possible, and therefore to determine the failure probability as accurately as possible.

The exemplary embodiment and/or method of the present invention provides that, starting out from the method of the type mentioned at the outset, these influence parameters should be evaluated in a control unit of the motor vehicle during the operation of the component, in order to determine the failure probability.

Therefore, the exemplary embodiment and/or method of the present invention provides for the influence parameters relevant to damage, in particular the parameters having an effect on the material fatigue of the component, being measured for each component during the entire useful life. During the operation of the component, the influence parameters are evaluated in a control unit of the motor vehicle to determine the failure probability. If the calculated failure probability or the gradient of the failure probability exceeds a specifiable limiting value, suitable countermeasures are initiated in order to prevent an actual failure of the component. The countermeasures range from simple acoustic or optical instructions to the driver of the motor vehicle or transmission of an instruction to a service center, to an emergency operation of the component, and up to a safety shutdown of the component. In addition, information about the collective loading recorded under real conditions may be transmitted, for example, by telemetry, to an evaluation center where this information may be used to design future components. As an alternative, the information may be read out in service garages, and for the information to be communicated to an evaluation center by way of the post office.

In the exemplary method of the present invention, the collective loading always corresponds to the real operation of the component whose failure probability should be determined. Unlike in the case of the related art, the collective loading no longer has to be estimated prior to the calculation of the failure probability. Since the collective loading is a determining influence parameter for verifying the fatigue limit of a component, the failure probability of a component may be determined in a substantially more accurate manner with the aid of the exemplary embodiment and/or method of the present invention. This allows, in turn, the component to be designed to have a fatigue limit and, indeed, a lower strength, without resulting in the component or the entire motor vehicle forfeiting reliability. The component is prevented from being over-dimensioned. This allows the component to be designed to be smaller, and to fulfill its function more effectively. In addition, the weight and cost of the component and the motor vehicle may be reduced.

According to an advantageous further refinement of the exemplary embodiment and/or method of the present invention, the failure probability may be determined within the scope of evaluating the influence parameters, by comparing a collective-damage sum, which is a measure of an accumulated loading of the component determined with the aid of the influence parameters, and a tolerable damage sum of the component, which is calculated in the preliminary stages of the evaluation of the influence parameters.

According to an exemplary embodiment of the present invention, the collective-damage sum may be determined within the scope of the evaluation of the influence parameters, using a linear damage-accumulation hypothesis according to Palmgren-Miner, as a function of a collective loading which is a measure of an accumulated loading of the component determined with the aid of the influence parameters, and as a function of a Woehler component-part curve, which is determined in the preliminary stages of evaluating the influence parameters and is a measure of the loading capacity of the component. According to this embodiment, the failure probability of the component is therefore determined according to the so-called nominal-stress concept, taking into consideration the tolerable-damage sum (D_50%), which is determined in a fatigue-limit test according to Palmgren-Miner. In this regard, reference is made to the reference book of Haibach, E.: Fatigue Limit, Methods and Data for Designing Component Parts, VDI Publishing House GmbH (1989), pp. 12–41, pp. 63–96, pp. 174–189, and pp. 191–225. Regarding the damage-accumulation hypothesis of Palmgren-Miner, reference is made to the article of Miner, M. A.: Cumulative Damage in Fatigue, Journal of Applied Mechanics 12 (1945), pp. 159–164. Specific incorporation by reference is made to the passages listed.

The collective loading is advantageously calculated within the scope of the evaluation of the influence parameters, as a function of a loading-time function which is introduced within the framework of evaluating the influence parameters with the aid of the influence parameters. A rainflow matrix, in which information regarding the accumulated loading of the component is stored, may be set up within the scope of the evaluation of the influence parameters, as a function of the loading-time function. The so-called rainflow method is therefore used to classify the loads occurring during the operation of the component, over the operating time or service life. Regarding the rainflow method, reference is made to Clormann, U. H., Seeger, T.: Rainflow—HCM—A Counting Method for Establishing Fatigue Limit on the Basis of Material Mechanics, Stahlbau [Steel Construction] 55 (1986), pp. 65–71. Specific incorporation by reference is made to this passage.

Another advantageous refinement of the exemplary embodiment and/or method of the present invention provides that tolerable damage sum (D_50%) of the component be determined on the basis of a linear damage-accumulation hypothesis according to Palmgren-Miner, as a function of a Woehler component-part curve, which is determined in the preliminary stages of the influence-parameter evaluation and is a measure of the loading capacity of the component, and as a function of a tolerable component loading (N_50%) determined in the preliminary stages of the influence-parameter evaluation.

An application of the exemplary method according to the present invention is the use for determining the failure probability of a direct-injecting gasoline-injection system of an internal combustion engine, a common-rail fuel-injection system of an engine, or a braking system of a motor vehicle.

The collective-damage sum and the tolerable-damage sum are each advantageously determined for several component parts of the fuel-injection system, in particular for a common storage strip (common rail), an injector member, a housing of a high-pressure pump, and/or a cylinder head of the high-pressure pump. These are the component parts, which are subjected to a particularly high loading during the operation of the fuel-injection system.

An injection pressure prevailing in the fuel-injection system may be measured and stored as an influence parameter during the operation of the fuel-injection system.

Particularly significant is the implementation of the exemplary method according to the present invention in the form of a memory element that is provided for a control unit to control and/or regulate a motor-vehicle function implementable by at least one component. In this context, a computer program that is executable on a computing element, in particular on a microprocessor, of the control unit and is suitable for carrying out the exemplary method according to the present invention, is stored on the memory element. In this case, the exemplary embodiment and/or method of the present invention is therefore realized by way of a computer program stored on the memory element, so that this memory element provided with the computer program constitutes the exemplary embodiment and/or method of the present invention in the same way as the method for whose implementation the computer program is suitable. In particular, an electrical storage medium, for example, a read-only memory, a random-access memory, or a flash memory, may be used as the memory element.

Using the control unit of the type mentioned at the outset as a starting point, as a further way of achieving the object of the exemplary embodiment and/or method of the present invention, the control unit may include an arrangement to evaluate the influence parameters for determining the failure probability of the component.

According to one advantageous further development of the exemplary embodiment and/or method of the present invention, the control unit may include an arrangement for implementing the exemplary method according to the present invention.

DETAILED DESCRIPTION

Figure 1:
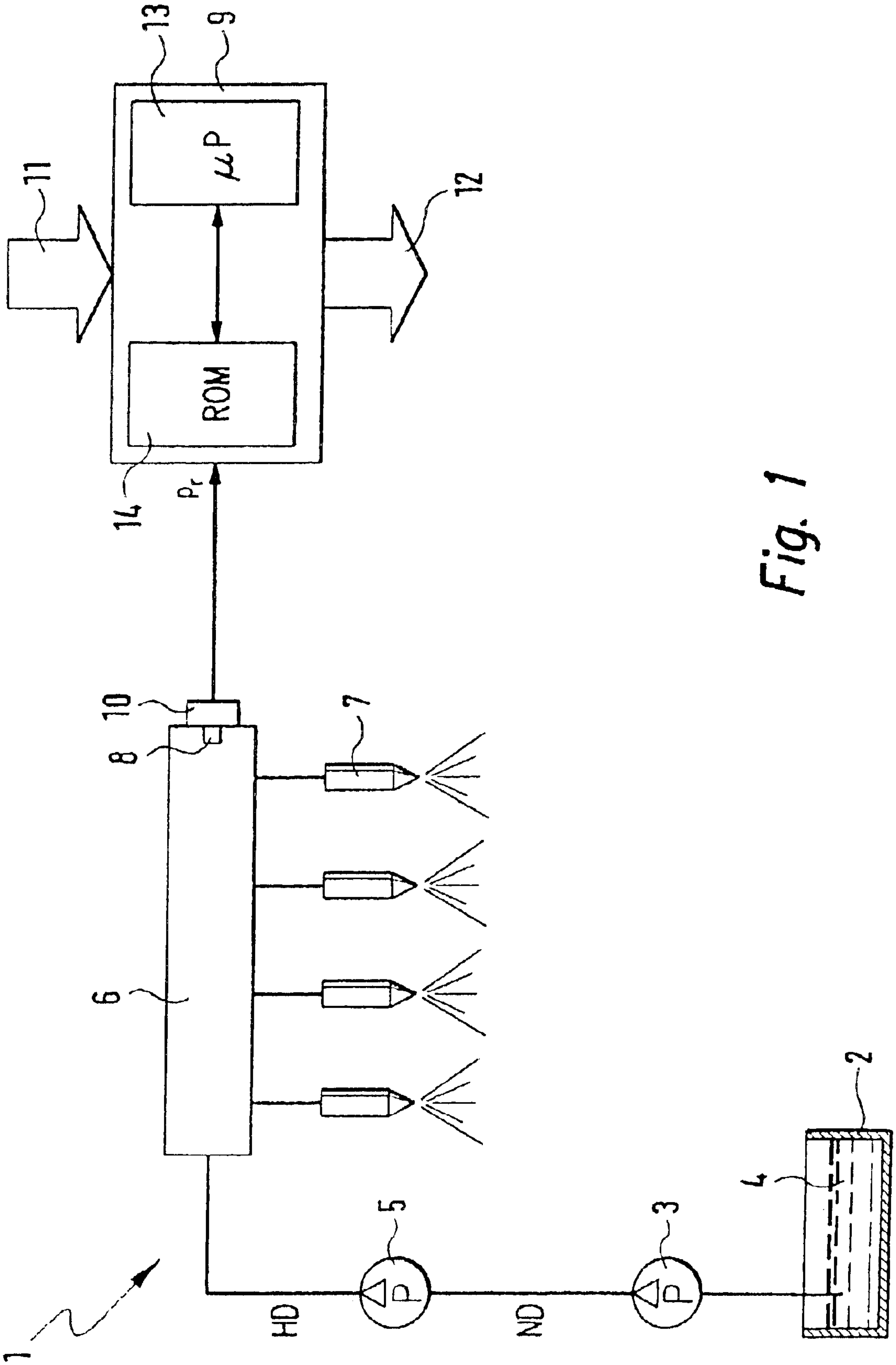
FIG. 1 shows a fuel-metering system having a control unit for implementing an exemplary method according to the present invention.

In FIG. 1, a fuel-metering system is designated in its entirety by reference numeral 1. Fuel-metering system 1 includes a fuel reservoir 2, from which a pre-supply pump 3 taking the form of an electric fuel pump transports fuel 4 into a low-pressure region ND of fuel-metering system 1. A high-pressure pump 5 delivers fuel from low-pressure region ND to a high-pressure region HD of fuel-metering system 1. In addition to a housing and a cylinder head of high-pressure pump 5, high-pressure region HD also includes a joint storage strip 6 (or common rail), in which fuel having an injection pressure p_r is contained, and fuel injectors 7 (so-called injectors), through which fuel from common rail 6 is injected at injection pressure p_r into combustion chambers of an internal combustion engine.

Situated in common rail 6 is a pressure sensor 8, which monitors injection pressure p_r and transmits it to a control unit 9 assigned to fuel-metering system 1. Detected pressure value p_r may be first converted into a corresponding electrical signal and optionally amplified in a measuring transducer 10, before it is transmitted to control unit 9. In addition to injection pressure p_r, control unit 9 receives several other input signals 11, which represent performance quantities of the internal combustion engine or fuel-metering system 1 that are measured by sensors. Control unit 9 generates output signals 12, by which the performance of the internal combustion engine or fuel-metering system 1 may be controlled via actuators. For example, injectors 7 or pre-supply pump 3 are triggered by output signals 12.

Among other things, controller 9 is provided for controlling and/or regulating the performance quantities of fuel-metering system 1 or the internal combustion engine. For example, the mass of fuel injected by injectors 7 into the combustion chambers of the engine is controlled and/or regulated by having control unit 9 vary the opening time of injectors 7, in particular with regard to a low fuel consumption and/or low pollutant emissions. In the same way, the delivery capacity of pre-supply pump 3 may be adjusted by varying the rotational speed of the electrical drive unit. For this purpose, control unit 9 is provided with a storage medium 14, in particular a flash memory, in which a control program capable of implementing the above-mentioned open-loop control and/or closed-loop control and/or regulation is stored. To execute the control program, it is either transmitted in its entirety, or per instruction, to a computing element 13, in particular a microprocessor, of control unit 9.

Figure 2:
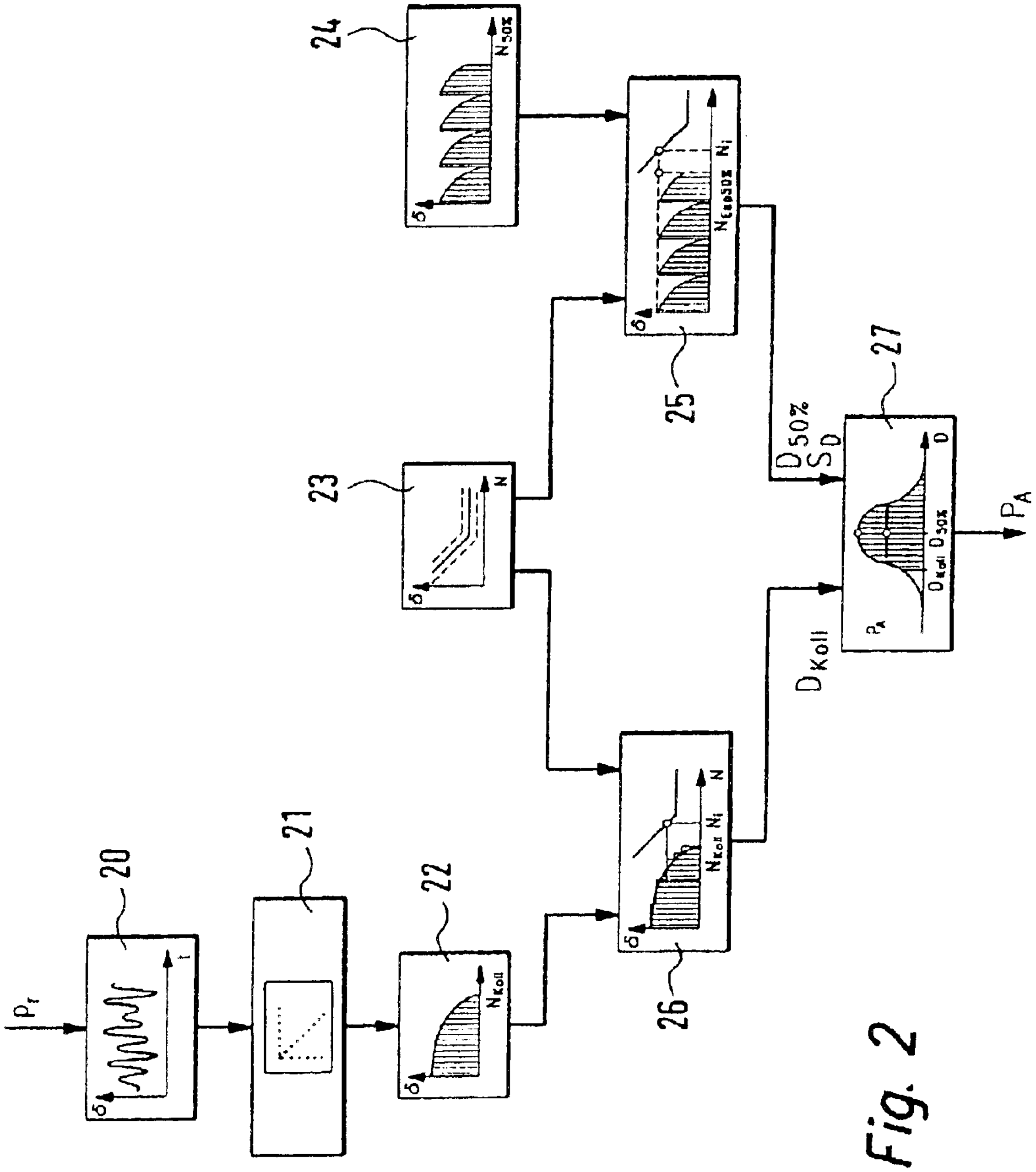
FIG. 2 shows a flowchart of an exemplary method of the present invention, according to an exemplary embodiment.

According to the exemplary embodiment and/or method of the present invention, a computer program, which is suitable for implementing the exemplary method of the present invention for determining failure probability P__A of a component, is also stored on storage medium 14. To this end, injection pressure p__r or other input signals 11 are measured and stored as influence parameters relevant to damage and evaluated in control unit 9. In the exemplary embodiment represented in FIG. 1, failure probability P__A of fuel-metering system 1 is determined with the aid of injection pressure p__r. In particular, component parts from high-pressure region HD of fuel-metering system 1 are component parts of fuel-metering system 1, which are particularly in danger of failing, because they are subjected to an especially high-pressure and, therefore, a high loading during the operation of fuel-metering system 1. A housing and a cylinder head of high-pressure port 5, bodies of injectors 7, and/or common rail 6 may be monitored. The method of the present invention is explained below in detail, using FIG. 2.

In a functional block 20, a load-time function δ(t) is first ascertained with the aid of pressure values p__r measured over time t. Load-time function δ(t) is characterized by the frequency and the amplitude of pressure vibrations that occur in common rail 6 during the operation of fuel-metering system 1. In this context, it is assumed that the higher the loading of fuel-metering system 1, the higher the amplitude and the mean position of the pressure vibrations. In addition, the number of pressure vibrations occurring also has a crucial effect on the loading.

In a functional block 21, recorded load-time function δ(t) is then classified with the aid of the so-called rainflow method. Several classes are defined for variably high loadings. The loads occurring during the operation of fuel-metering system 1, over the operating time or service life, are assigned to the corresponding classes and summed up in a class-specific manner. One obtains a so-called rainflow matrix, in which information regarding the classified, accumulated loading of fuel-metering system 1 during operation is stored. Regarding the rainflow method, reference is made to Clormann, U. H., Seeger, T.: Rainflow—HCM—A Counting Method for Establishing Fatigue Limit on the Basis of Material Mechanics, Stahlbau [Steel Construction] 55 (1986), pp. 65–71. Specific incorporation by reference is made to this passage.

The rainflow matrix is the observation function of the loading and is documented as a so-called stress-pair representation in a functional block 22, without consideration of the mean loads. This loading collective (or collective loading) corresponds to the real operation of fuel-metering system 1, since it was determined with the aid of the time characteristic of the measured injection-pressure values actually occurring.

In the preliminary stages of determining failure probability P__A of fuel-metering system 1, Woehler curves N(δ) for all of the component parts of fuel-metering system 1 subjected to particularly high loadings during operation are ascertained in a functional block 23, within the scope of a (practical) Woehler component-part test (single-stage test) (cf. Haibach, E.: Fatigue Limit . . . , at the specified location, Chapter 2.1 Woehler Tests). In the present exemplary embodiment, these component parts include the housing and the cylinder head of high-pressure pump 5, common rail 6, and the bodies of injectors 7. Woehler component-part curve N(δ) is therefore an observation function of the loading capacity of the component part.

The Woehler line is represented in the control unit as a “weighting matrix”. For each element of the rainflow matrix, one element of the weighting matrix represents the loading cycle for 50% probability of being exceeded or its reciprocal value (depending on which representation is more suitable computationally (for a computer)), the average stress sensitivity of the corresponding common-rail component already being counted into the weighting matrix. Damage sum D__koll is then calculated according to the equation of:

$$D_{koll} = \sum_i \sum_j \frac{r_{ij}}{g_{ij}} \text{ or } D_{koll} = \sum_i \sum_j r_{ij} g_{ij},$$

where r represents the rainflow matrix and g represents the weighting matrix.

The advantages of this representation are believed to be that:

- the computationally intensive calculation of the breaking-load cycle for an element of the rainflow matrix from Woehler-line parameters k, N__D und p__D50%, as well as the average stress correction with the aid of M in each calculation of damage sum D__koll, are eliminated; and
- the weighting matrices for the injector bodies and pump housing or pump-cylinder head may be adapted as elements (element-by-element) in such a manner, that they, together with the rainflow matrix of the rail pressure, yield correct values for the damage sum of these components, although these components are subjected to different pressure-time curves (pressure overshoot).

In the preliminary stages of determining failure probability P__A, tolerable loadings N__50% of the individual component parts of fuel metering system 1 are also determined in a functional block 24, within the scope of a practical fatigue-limit test (multistage test) (cf. Haibach, E.: Fatigue Limit . . . , at the specified location, Chapter 2.2.1 Working Load and Collective Loading). In the scope of the fatigue-limit test, the component parts are loaded to the point of failure, using a “typical” collective loading.

Using the tolerable loadings of the component parts calculated within the scope of the fatigue-limit test, and Woehler component-part curves N(δ) determined within the scope of the Woehler component-part test, tolerable damage sum D__50% of fuel-metering system 1 is also determined in the preliminary stages of the determination of failure probability P__A of fuel-metering system 1, in a functional block 25. This is accomplished within the scope of the damage calculation, using the danger-accumulation hypothesis according to Palmgren-Miner (cf. Miner, M. A.: Cumulative Damage in Fatigue, J. Appl. Mech. 12 (1945), pp. 159–164 and Haibach, E.: Fatigue Limit . . . , at the specified location, Chapter 3.2 Calculation of Service Life from the Nominal Stress), which is incorporated by reference. Damage sum D_50% is the damage sum at which the components of fuel-metering system 1 fail under collective loading. Damage sums D_50% determined in the preliminary stages for the various components subjected to high loading are stored in memory element 14 of control unit 9 and may be retrieved from there as needed.

In a functional block 26, collective-damage sum D_Koll at the current time is also calculated on the basis of the collective loading determined within the scope of the exemplary method according to the present invention and Woehler component-part curves N(δ), using the damage-accumulation hypothesis according to Palmgren-Miner (cf. Miner, M. A.: Cumulative Damage in Fatigue, J. Appl. Mech. 12 (1945), pp. 159–164 and Haibach, E.: Fatigue Limit . . . , at the specified location, Chapter 3.2 Calculation of Service Life from the Nominal Stress), which is incorporated by reference.

In a functional block 27, failure probability P_A is then calculated by comparing tolerable damage sum D_50% and collective-damage sum D_Koll. In the present exemplary embodiment, a statistical distribution curve having a standard deviation s_D is plotted versus tolerable-damage sum D_50%, and failure probability P_A is calculated as the area underneath the distribution curve in the range of $D=-\infty$ to collective-damage sum D_Koll.

In the exemplary embodiment and/or method of the present invention, the collective loading is determined in functional block 22, using the time characteristic of measured injection-pressure values p_r that actually occur, that is, realistically. Since the collective loading is a determining influence parameter for establishing the fatigue limit of a component, failure probability P_A may be determined at a particularly high accuracy with the aid of the present invention. This in turn allows the components, that is, the individual component parts of the components, to be designed to have a fatigue limit, so that they do have a lower strength. However, this would not result in a loss in the reliability of the components or the entire motor vehicle. This allows the component to be designed to be smaller, and to fulfill its function more effectively. In addition, the weight and cost of the component and the motor vehicle may be reduced.

Finally, it is believed to be particularly advantageous that the collective loading determined in functional block 22 under real conditions is always available and may be used, for example within the scope of the fatigue-limit test in functional block 24, as a "typical" collective loading for determining tolerable loading N_50% of the component parts. This allows tolerable loading N_50% of the component parts, and therefore tolerable loading D_50% of the component as well, to be determined in what is believed to be a considerably more accurate manner.

What is claimed is:

1. A method for determining a failure probability of a component of a motor vehicle, the method comprising:

monitoring data in the form of damage-relevant influence parameters, which affect the failure probability of the component;

storing the data during operation of the component; and evaluating the influence parameters in a control unit of the motor vehicle to determine the failure probability during the operation of the component, wherein the failure probability is determined within a scope of the evaluating of the influence parameters, by comparing a collective-damage sum, which is a measure of an accumulated loading of the component that is determined with the aid of the influence parameters, and a tolerable-damage sum of the component determined in preliminary stages of the evaluating of the influence parameters.

2. The method of claim 1, wherein the collective-damage sum is determined within the scope of the evaluating of the influence parameters, with the aid of a linear damage-accumulation hypothesis according to Palmgren-Miner, as a function of a collective loading which is a measure of an accumulated loading of the component that is determined using the influence parameters, and as a function of a Woehler component-part curve, which is a measure of the loading capacity of the component.

3. The method of claim 2, wherein the collective loading is calculated within the scope of the evaluating of the influence parameters, as a function of a loading-time function, which is recorded within a framework of the evaluating of the influence parameters, using the influence parameters.

4. The method of claim 3, wherein, within the scope of evaluating the influence parameters, a rainflow matrix, in which information regarding the accumulated loading of the component is stored, may be set up as a function of the loading-time function.

5. The method of claim 1, wherein the tolerable damage sum of the component is determined according to a linear damage-accumulation hypothesis of Palmgren-Miner, as a function of a Woehler component-part curve, which is determined in preliminary stages of the evaluating of the influence parameters and is a measure of the loading capacity of the component, and as a function of a tolerable loading of component parts of the component determined in the preliminary stages of the evaluating of the influence parameters.

6. A method for determining a failure probability of a component of a motor vehicle, the method comprising:

monitoring data in the form of damage-relevant influence parameters, which affect the failure probability of the component;

storing the data during operation of the component; and evaluating, during the operation of the component, the influence parameters in a control unit of the motor vehicle to determine the failure probability of the component;

wherein the failure probability is determined for the component which is one of: at least one of a direct-injecting fuel-injection system and a common-rail fuel-injection system of an internal combustion engine; and a braking system of a motor vehicle.

7. A method for determining a failure probability of a component of a motor vehicle, the method comprising:

monitoring data in the form of damage-relevant influence parameters, which affect the failure probability of the component;

storing the data during operation of the component; and evaluating the influence parameters in a control unit of the motor vehicle to determine the failure probability during the operation of the component, wherein the failure probability is determined for the component which is one of: at least one of a direct-injecting fuel-injection system and a common-rail fuel-injection system of an internal combustion engine; and a braking system of a motor vehicle, and wherein a collective-damage sum, which is a measure of an accumulated loading of the component that is determined with the aid of the influence parameters, and a tolerable-damage sum of the component determined in preliminary stages of the evaluating of the influence parameters are each determined for at least one of a joint common rail, an injector body, a housing of a high-pressure pump, and a cylinder head of the high-pressure pump.

8. A method for determining a failure probability of a component of a motor vehicle, the method comprising:

monitoring data in the form of damage-relevant influence parameters, which affect the failure probability of the component;

storing the data during operation of the component; and evaluating the influence parameters in a control unit of the motor vehicle to determine the failure probability during the operation of the component, wherein the failure probability is determined for the component which is one of: at least one of a direct-injecting fuel-injection system and a common-rail fuel-injection system of an internal combustion engine; and a braking system of a motor vehicle, and wherein an injection pressure prevailing in the fuel-injection system is measured and stored as one of the influence parameters during operation of the fuel-injection system.

9. A control unit for controlling a motor-vehicle function implementable by at least one component, comprising:

an arrangement to measure and store data in the form of damage-element influence parameters, which affect a failure probability of the component during operation of the component; and an arrangement to evaluate the influence parameters for determining the failure probability of the component, wherein the control unit includes an arrangement to determine the failure probability within a scope of the evaluating of the influence parameters, by comparing a collective-damage sum, which is a measure of an accumulated loading of the component that is determined with the aid of the influence parameters, and a tolerable-damage sum of the component determined in preliminary stages of the evaluating of the influence parameters.

10. The control unit of claim 9, wherein the collective-damage sum is determined within the scope of the evaluating of the influence parameters, with the aid of a linear damage-accumulation hypothesis according to Palmgren-Miner, as a function of a collective loading which is a measure of an accumulated loading of the component that is determined using the influence parameters, and as a function of a Woehier component-part curve, which is a measure of the loading capacity of the component.

11. The control unit of claim 10, wherein the collective loading is calculated within the scope of the evaluating of the influence parameters, as a function of a loading-time function, which is recorded within a framework of the evaluating of the influence parameters, using the influence parameters.

12. The control unit of claim 11, wherein, within the scope of evaluating the influence parameters, a rainflow matrix, in which information regarding the accumulated loading of the component is stored, may be set up as a function of the loading-time function.

13. The control unit of claim 9, wherein the tolerable damage sum of the component is determined according to a linear damage-accumulation hypothesis of Palmgren-Miner, as a function of a Woehler component-part curve, which is determined in preliminary stages of the evaluating of the influence parameters and is a measure of the loading capacity of the component, and as a function of a tolerable loading of component parts of the component determined in the preliminary stages of the evaluating of the influence parameters.

14. A control unit for controlling a motor-vehicle function implementable by at least one component, comprising:

an arrangement to measure and store, during operation of the component, data in the form of damage-element influence parameters, which affect a failure probability of the component; and an arrangement to evaluate, during operation of the component, the influence parameters for determining the failure probability of the component;

wherein the failure probability is determined for the component which is one of: at least one of a direct-injecting fuel-injection system and a common-rail fuel-injection system of an internal combustion engine; and a braking system of a motor vehicle.

15. A control unit for controlling a motor-vehicle function implementable by at least one component, comprising:

an arrangement to measure and store data in the form of damage-element influence parameters, which affect a failure probability of the component during operation of the component; and an arrangement to evaluate the influence parameters for determining the failure probability of the component, wherein the failure probability is determined for the component which is one of: at least one of a direct-injecting fuel-injection system and a common-rail fuel-injection system of an internal combustion engine; and a braking system of a motor vehicle, and wherein a collective-damage sum, which is a measure of an accumulated loading of the component that is determined with the aid of the influence parameters, and a tolerable-damage sum of the component determined in preliminary stages of the evaluating of the influence parameters are each determined for at least one of a joint common rail, an injector body, a housing of a high-pressure pump, and a cylinder head of the high-pressure pump.

16. A control unit for controlling a motor-vehicle function implementable by at least one component, comprising:

an arrangement to measure and store data in the form of damage-element influence parameters, which affect a failure probability of the component during operation of the component; and an arrangement to evaluate the influence parameters for determining the failure probability of the component, wherein the failure probability is determined for the component which is one of: at least one of a direct-injecting fuel-injection system and a common-rail fuel-injection system of an internal combustion engine; and a braking system of a motor vehicle, and wherein an injection pressure prevailing in the fuel-injection system is measured and stored as one of the influence parameters during operation of the fuel-injection system.

17. A stored computer program, the computer program, when executed by a computer, causes the computer to perform the following steps:

monitoring data in the form of damage-relevant influence parameters, which affect the failure probability of the component;

storing the data during operation of the component; and evaluating the influence parameters in a control unit of the motor vehicle to determine the failure probability during the operation of the component, wherein the failure probability is determined within a scope of the evaluating of the influence parameters, by comparing a collective-damage sum, which is a measure of an accumulated loading of the component that is determined with the aid of the influence parameters, and a tolerable-damage sum of the component determined in preliminary stages of the evaluating of the influence parameters.

* * * * *